US009146300B2

(12) United States Patent
Rieger, III

(10) Patent No.: US 9,146,300 B2
(45) Date of Patent: *Sep. 29, 2015

(54) LOCATION-DETERMINING SYSTEM FOR RADIO CLIENTS WITHIN LOCAL-AREA SPACES

(75) Inventor: Charles J. Rieger, III, Potomac, MD (US)

(73) Assignee: HERE Global B.V., Veldhoven (NL)

( * ) Notice: Subject to any disclaimer, the term of this patent is extended or adjusted under 35 U.S.C. 154(b) by 371 days.

This patent is subject to a terminal disclaimer.

(21) Appl. No.: 13/616,196

(22) Filed: Sep. 14, 2012

(65) Prior Publication Data

US 2013/0012223 A1 Jan. 10, 2013

Related U.S. Application Data

(63) Continuation of application No. 12/857,808, filed on Aug. 17, 2010, now Pat. No. 8,294,617.

(51) Int. Cl.
*G01S 5/10* (2006.01)
*G01S 5/14* (2006.01)

(52) U.S. Cl.
CPC .... *G01S 5/10* (2013.01); *G01S 5/14* (2013.01)

(58) Field of Classification Search
USPC .......................... 342/450, 451, 457, 463–465; 455/456.6, 457
See application file for complete search history.

(56) References Cited

U.S. PATENT DOCUMENTS

| 3,150,372 | A | 9/1964 | Groth, Jr. |
| 8,294,617 | B2 * | 10/2012 | Rieger, III ............ 342/464 |
| 2009/0322603 | A1 | 12/2009 | Liao |
| 2012/0044109 | A1 | 2/2012 | Rieger, III |

OTHER PUBLICATIONS

Tauber, Joshua A., "Indoor Location Systems for Pervasive Computing" Paper (Aug. 8, 2002).
Liu, H., Darabi, H., Banerjee, P., and Liu, J., "Survey of Wireless Indoor Positioning Techniques and Systems", IEEE Transactions on Systems, Man, and Cybernetics-Part C: Application and Reviews, vol. 37, No. 6 (Nov. 2007).
Extended European Search Report, Nov. 17, 2011, pp. 1-6.
European Office Action cited in EP 11 174 476.9, mailed Oct. 30, 2014.

* cited by examiner

*Primary Examiner* — Dao Phan
(74) *Attorney, Agent, or Firm* — Lempia Summerfield Katz LLC

(57) ABSTRACT

Systems, devices, features, and/or methods for determining a location of a mobile device are disclosed. A method may include (a) receiving, into a mobile device, a common RF signal on a common carrier frequency, wherein the common RF signal includes a respective RF signal output by each of three or more transmitters on a common time basis in a round-robin manner, and wherein each of the three or more transmitters is positioned at a known location, (b) capturing data representing the common RF signal, (c) based on the captured data, discriminating between each respective RF signal that forms the received common RF signal, (d) determining a relative phase shift of each respective RF signal, and (e) determining the location of the mobile device based on the determined relative phase shifts and the known locations of the three or more transmitters.

28 Claims, 7 Drawing Sheets

LOCATION-DETERMINING SYSTEM FOR RADIO CLIENTS WITHIN LOCAL-AREA SPACES

This application is a continuation under 37 C.F.R §1.53(b) of U.S. patent application Ser. No. 12/857,808 filed on Aug. 17, 2010, which is hereby incorporated by reference in its entirety.

BACKGROUND OF THE INVENTION

One emerging area of wireless communications is the provision of services based on a location of a mobile device. These location-based services may take various forms. For example, a location-based service may provide a user of the mobile device with a weather or traffic report relevant to the user's location. As another example, a location-based service may provide the user with a list of services or establishments (e.g., restaurants, parks, theatres, etc.) in the user's vicinity. As still another example, a location-based service may provide the user with an advertisement or coupon relevant to a product in the user's vicinity.

To facilitate the provision of location-based services to a user of a mobile device, a location-based service provider accurately determines and/or tracks the location of the mobile device. Various technologies currently exist to determine and/or track the location of a mobile device, the most prevalent of which are Global Positioning System (GPS) technologies and cellular network technologies. However, these technologies have drawbacks regarding accurate determination and/or tracking of a mobile device location, such as in an indoor environment. Accordingly, an improved location-determination system that is capable of accurately determining and/or tracking the location of a mobile device, such as, for example, in an indoor environment, is desirable.

SUMMARY OF THE INVENTION

According to one aspect, a method of determining a location of a mobile device is provided. For example, the method may include (a) receiving, into a mobile device, a common RF signal on a common carrier frequency, wherein the common RF signal includes a respective RF signal output by each of three or more transmitters on a common time basis in a round-robin manner, and wherein each of the three or more transmitters is positioned at a known location, (b) capturing data representing the common RF signal, (c) based on the captured data, discriminating between each respective RF signal that forms the received common RF signal, (d) determining a relative phase shift of each respective RF signal, and (e) determining the location of the mobile device based on the determined relative phase shifts and the known locations of the three or more transmitters.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

I. Exemplary Location-Determination System

Figure 1:
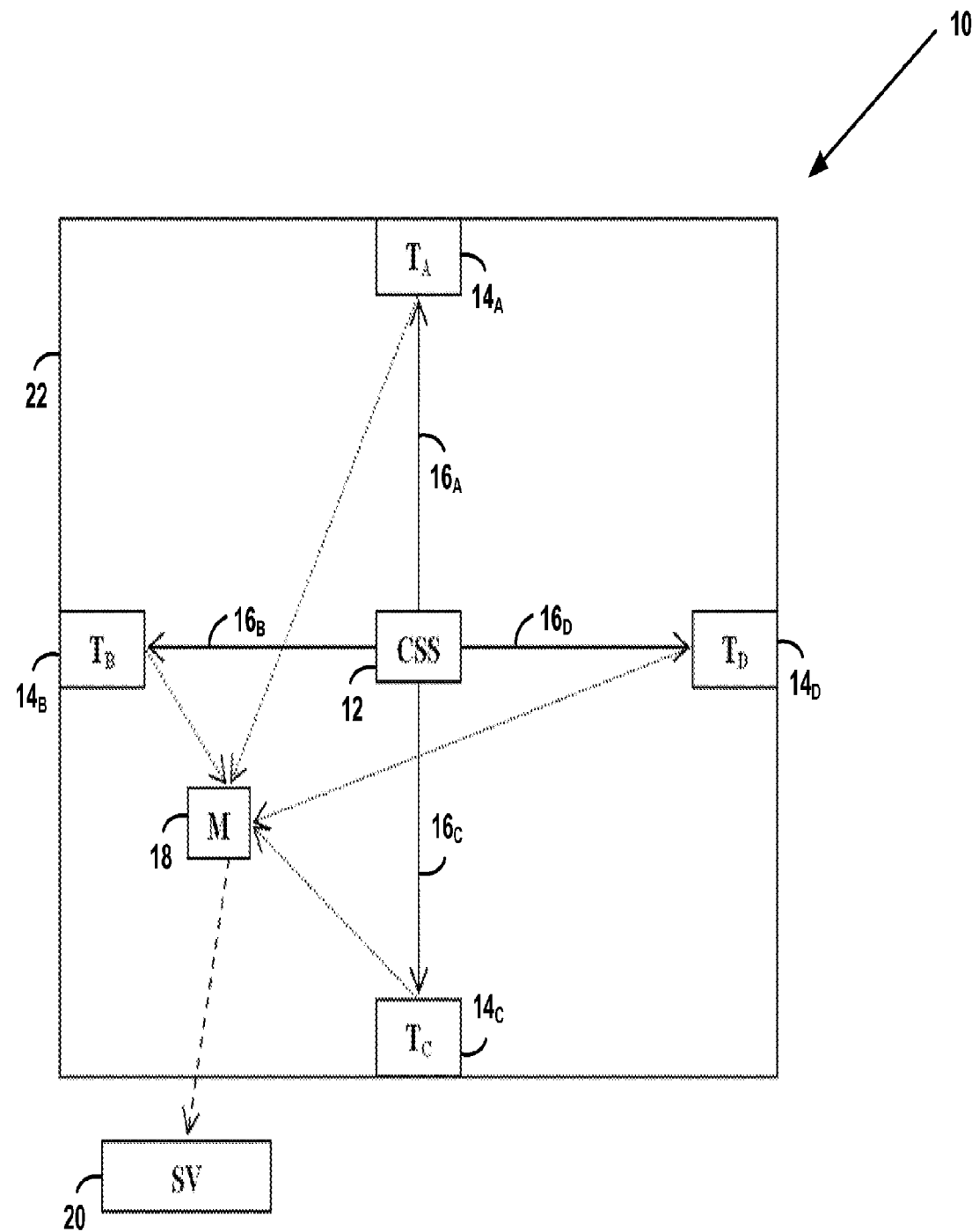
FIG. 1 is a simplified block diagram of exemplary communication system configured to determine a location of a mobile device within an indoor environment.

FIG. 1 is a simplified block diagram of exemplary communication system 10 configured to determine a location of a mobile device within an indoor environment 22. As shown, communication system 10 may include a common signal source (CSS) 12 coupled to transmitters $14_A$-$14_D$ via links $16_A$-$16_D$, a mobile device 18, and a central server 20. Other configurations may be provided as well.

It should be understood that the arrangements described herein are set forth for purposes of example only. As such, those skilled in the art will appreciate that other arrangements and other elements (e.g., components, interfaces, functions, orders of functions, etc.) can be used instead, some elements may be added, and/or some elements may be omitted altogether. Further, those skilled in the art will appreciate that many of the elements described herein are functional elements that may be implemented as discrete or distributed components or in conjunction with other components, and in any suitable combination and location. Still further, various functions described herein as being performed by one or more entities may be carried out by hardware, firmware and/or software. For instance, various functions may be carried out by a processor executing a set of program instructions written in any suitable programming language (e.g., C, C++, Java, etc.) and stored in memory.

CSS 12 may be any device configured to drive each of transmitters $14_A$-$14_D$ to output a respective radio frequency (RF) signal on a common time basis (i.e., CSS 12 may drive each of transmitters $14_A$-$14_D$ such that act as slave clocks that are coordinated with a master clock, and thus output respective RF signals that are synchronized according to the master clock). CSS 12 may include various components that enable it to perform this function. For instance, CSS 12 may include a high-precision master clock (e.g., a 300 MHz clock), one or more signal generators (e.g., a square wave generator, a sinusoidal wave generator, etc.), and one or more line drivers (e.g., differential line drivers). Additionally, in some embodiments, CSS 12 may include delay circuitry. Other configurations of CSS 12 are possible as well.

Each of transmitters $14_A$-$14_D$ may be any device configured to be driven by CSS 12 to output a respective RF signal on a common time basis. Each of transmitters $14_A$-$14_D$ may include various components that enable the transmitter to perform this function. For instance, each of transmitters $14_A$-$14_D$ may include a line receiver (e.g., a differential line receiver), an amplifier, and an antenna. Additionally, in some embodiments, each of transmitters $14_A$-$14_D$ may include a modulator. Other configurations of transmitters $14_A$-$14_D$ are possible as well.

In the embodiments described herein, transmitters $14_A$-$14_D$ are positioned at fixed locations within indoor environment 22. For example, transmitters $14_A$-$14_D$ may be affixed to or embedded in walls, ceilings, and/or floors within the indoor environment 22. Other examples are possible as well. Each of transmitters $14_A$-$14_D$ may thus have a known location within indoor environment 22 (e.g., a local coordinate). Further, in some embodiments, each of transmitters $14_A$-$14_D$ may have a known location within a global environment (e.g., a geographic coordinate) as well.

Each of links $16_A$-$16_D$ may be any wired and/or wireless link configured to carry one or more signals from CSS 12 to one of transmitters $14_A$-$14_D$. For instance, each of links $16_A$-$16_D$ may include a first cable (e.g., a twisted-pair copper cable) configured to carry a first signal from CSS 12 to one of transmitters $14_A$-$14_D$. Additionally, in some embodiments, each of links $16_A$-$16_D$ may include a second cable (e.g., a twisted-pair copper cable) configured to carry a second signal from CSS 12 to one of transmitters $14_A$-$14_D$. Each of links $16_A$-$16_D$ may take other forms as well.

In the embodiments described herein, each of links $16_A$-$16_D$ will have defined transmission properties, such as length and propagation speed. For instance, links $16_A$-$16_D$ may all have the same defined transmission properties. Alternatively, links $16_A$-$16_D$ may have different defined transmission properties. In either case, CSS 12 may use the defined transmission properties of links $16_A$-$16_D$ to ensure that all transmitters $14_A$-$14_D$ are being driven on a common time basis.

Mobile device 18 may be any device configured to receive and process RF signals from transmitters $14_A$-$14_D$ and send wireless communications to central server 20. The mobile device 18 is a personal navigation device ("PND"), a portable navigation device, a cellular telephone, a mobile phone, a personal digital assistant ("PDA"), a watch, a camera, a computer, and/or any other mobile device. Mobile device 18 may include various components that enable it to perform the recited functions. For instance, mobile device 18 may include a microprocessor, an RF receiver (e.g., an amplitude modulation (AM) receiver, a phase-shift keying (PSK) receiver/demodulator, etc.), and a wireless transceiver (e.g., an 802.11 chipset). Further, in some embodiments, mobile device 18 may include timestamping circuitry, such as an edge detector configured to detect a rising/falling edge or a zero-crossing (e.g., high-speed comparator), a high-frequency timestamping clock configured to define a master time base (e.g., a 300 MHz cyclical 32-bit counter), and a timestamp latch configured to generate an interrupt signal when each new edge is captured). Further yet, in other embodiments, mobile device 18 may include an analog-to-digital (A/D) converter configured to capture signal strength samples and generate interrupts at a predefined rate (e.g., 50 MHz). As examples, mobile device 18 may take the form of a cell phone, a personal navigation device (PND), or a tag. Other configurations of mobile device 18 are possible as well.

Central server 20 may be any device configured to receive and store data regarding a location of mobile device 18 (as well as other mobile devices) within indoor environment 22. Central server 20 may include various components that enable it to perform these functions. For instance, central server 20 may include a processor, data storage, and a wireless transceiver (e.g., an 802.11 card). Other configurations of central server 20 are possible as well.

II. Exemplary Location-Determination Method

Figure 2:
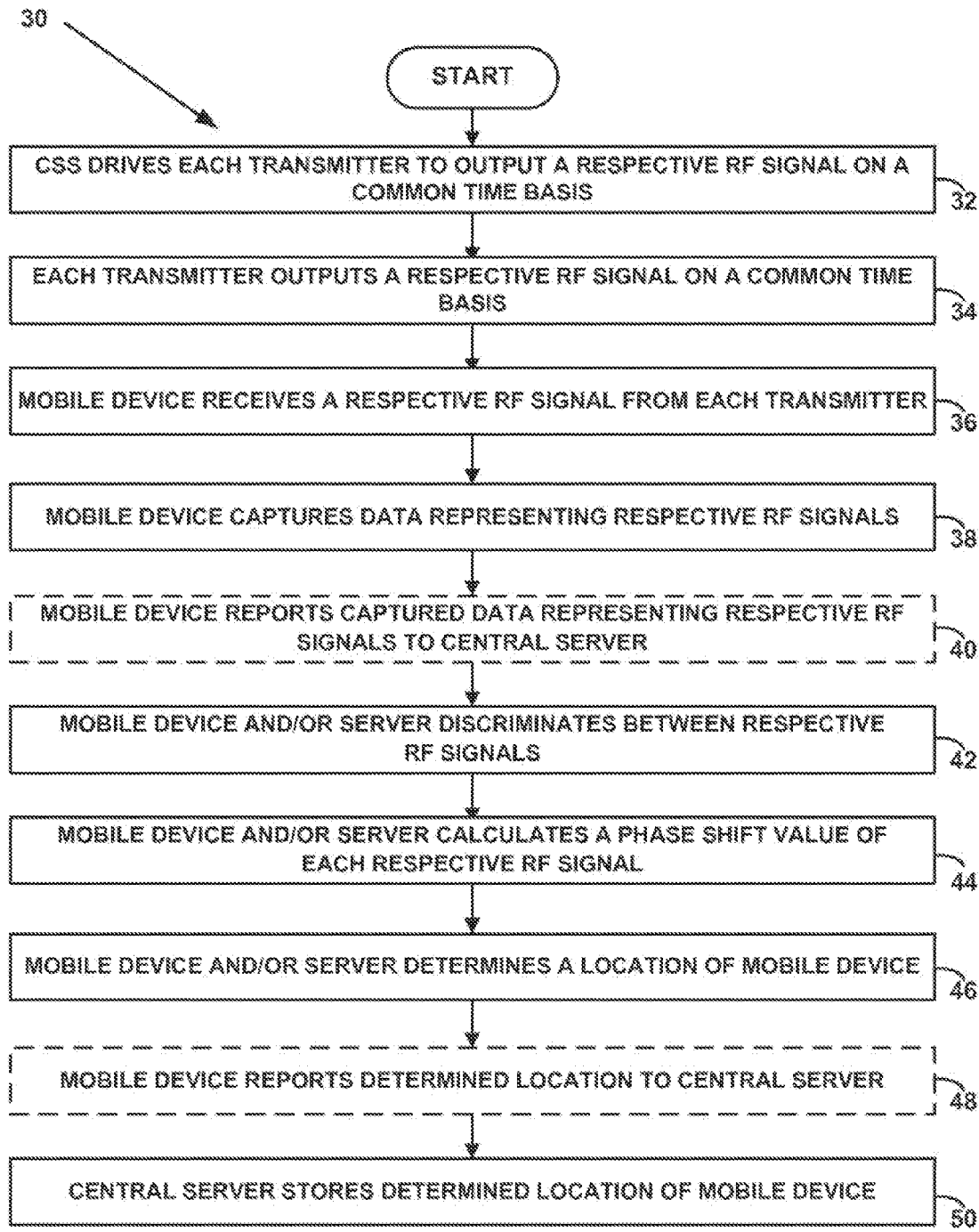
FIG. 2 is a simplified flow chart of an exemplary method 30 for determining a location of a mobile device within an indoor environment.

FIG. 2 is a simplified flow chart of an exemplary method 30 for determining a location of a mobile device within an indoor environment. Fewer or more steps may be provided. For purposes of illustration, exemplary method 30 will be described with reference to communication system 10 determining a location of mobile device 18 within indoor environment 22, but it should be understood that exemplary method 30 may be applicable to other systems as well. In one example, one or more steps of exemplary method 30 may be embodied as program instructions stored on a non-transitory computer-readable medium and executable by a processor.

As shown in FIG. 2, exemplary method 30 begins at step 32 with CSS 12 driving each of transmitters $14_A$-$14_D$ to output a respective RF signal on a common time basis. In turn, at step 34, each of transmitters $14_A$-$14_D$ may be outputting a respective RF signal on a common time basis.

At step 36, mobile device 18 may be receiving a respective RF signal from each of transmitters $14_A$-$14_D$. In turn, at step 38, mobile device 18 may capture data representing the respective RF signals. At step 40, mobile device 18 may also optionally report the captured data representing the respective RF signals to central server 20.

At step 42, based on the captured data representing the respective RF signals, mobile device 18 and/or central server 20 may discriminate between the respective RF signals and thereby identify which respective RF signal was output by which of transmitters $14_A$-$14_D$. In turn, at step 44, mobile device 18 and/or central server 20 may calculate a phase shift value of each respective RF signal. At step 46, mobile device 18 and/or central server 20 may then use the calculated phase shift values and the known location(s) of each of transmitters $14_A$-$14_D$ to determine a location of mobile device 18 (e.g., a location coordinate and perhaps a geographic coordinate).

At step 48, if mobile device 18 determines its location, mobile device 18 may also report the determined location to central server 20. At step 50, central server 20 may then store the determined location of mobile device 18 for future reference.

Advantageously, the exemplary location-determination method may enable communication system 10 to accurately determine and/or track the location of mobile device 18. In turn, a location-based service provider may use the determined location of mobile device 18 to provide a user of mobile device 18 with location-based services. For example, if mobile device 18 is located in a store (e.g., a retail store or a grocery store) in which locations are being monitored by communication system 10, a location-based service provider may be able to provide a user of mobile device 18 with an advertisement or coupon relevant to a product in the user's vicinity. Many other examples are possible as well.

III. Embodiments of the Exemplary Location-Determination Method

Embodiments of exemplary method 30 will now be described. As above, for purposes of illustration, the embodiments of exemplary method 30 will be described with reference to communication system 10 determining a location of mobile device 18 within indoor environment 22, but it should be understood that exemplary method 30 may be applicable to other systems as well.

a. First Embodiment

Figure 3A:
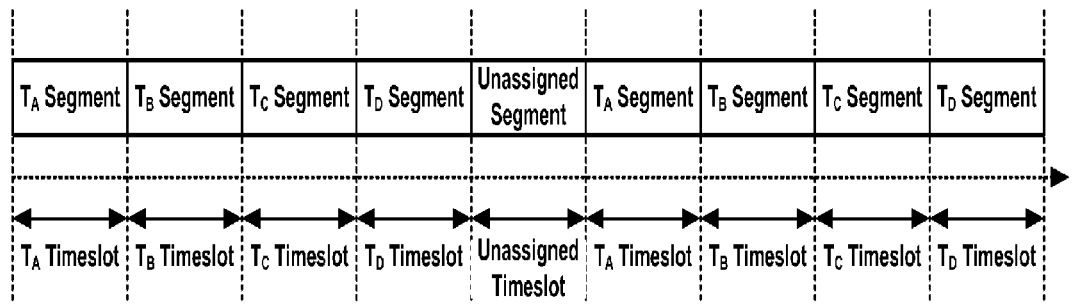
FIG. 3(a) illustrates a portion of a common drive signal generated by the central signal source (CSS) in the system of FIG. 1, according to an example of a first embodiment.

A first embodiment of exemplary method 30 begins at step 32 with CSS 12 driving each of transmitters $14_A$-$14_D$ to output a respective RF signal on a common time basis and a common carrier frequency in a round-robin manner. For instance, CSS 12 may be generating a common drive signal that has repeating periods of timeslots, each having at least one timeslot assigned to each of transmitters $14_A$-$14_D$ in a round-robin manner and at least one unassigned timeslot. Each timeslot may be occupied by a respective signal segment of the common drive signal. The arrangement of these timeslot periods may take various forms, and may be a known system parameter. In one example, as shown in FIG. 3(a), each period of timeslots of the common drive signal may be arranged to have a first timeslot assigned to transmitter $14_A$, a second timeslot assigned to transmitter $14_B$, a third timeslot assigned to transmitter $14_C$, a fourth timeslot assigned to transmitter $14_D$, and a fifth timeslot that is unassigned. Other examples are possible as well.

Each signal segment may take various forms. For example, each signal segment may take the form of an integral number of cycles (e.g., 64 cycles) of a periodic waveform having a common frequency, such as a sinusoidal wave having a frequency in the long-wave or medium-wave band range (e.g., 148.5 KHz to 283.5 KHz or 520 KHz to 1710 KHz) or a square wave having a frequency in the baseband range (e.g., 5 KHz to 20 KHz). In this respect, CSS 12 may generate the common drive signal as a continuous waveform. Other examples are possible as well.

Figure 3B:
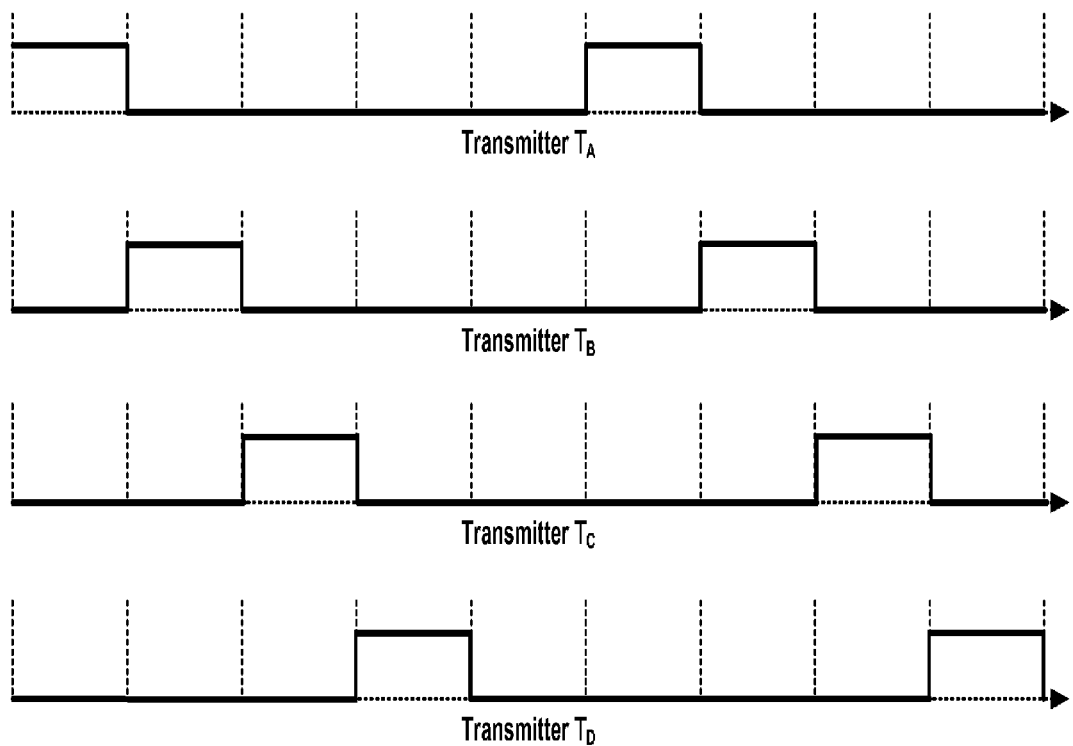
FIG. 3(b) illustrates a portion of a respective timeslot assignment signal for each of the transmitters in the system of FIG. 1, according to an example of the first embodiment.

To communicate the timeslot assignments to transmitters $14_A$-$14_D$, CSS 12 may additionally be generating for each of transmitters $14_A$-$14_D$ a respective timeslot assignment signal that identifies which timeslots in the common drive signal are assigned to the transmitter. Each such timeslot assignment signal may take various forms. For example, as shown in FIG. 3(b), each timeslot assignment signal may take the form of a bit sequence, with each "1" bit identifying the timeslot in the parallel common drive signal as being assigned to the transmitter and each "0" bit identifying the timeslot in the parallel common drive signal as being assigned to a different transmitter. Other examples are possible as well.

CSS 12 may then be outputting to each of transmitters $14_A$-$14_D$ the common drive signal and a respective timeslot assignment signal. In this respect, CSS 12 may be delaying the output of the common drive signal and a respective timeslot assignment signal to at least one of transmitters $14_A$-$14_D$, to ensure that all of transmitters $14_A$-$14_D$ receive these signals on a common time basis. For instance, CSS 12 may be delaying the output of these signals to each of transmitters $14_A$-$14_D$ in an amount that is inversely proportional to the length of the transmitter's link (e.g., zero or minimum delay for the longest link and maximum delay for the shortest link). Other examples are possible as well. As a result of CSS 12 outputting to each of transmitters $14_A$-$14_D$ the common drive signal and a respective timeslot assignment signal, each of transmitters $14_A$-$14_D$ may then be receiving the common drive signal and a respective timeslot assignment signal on a common time basis.

Figure 3C:
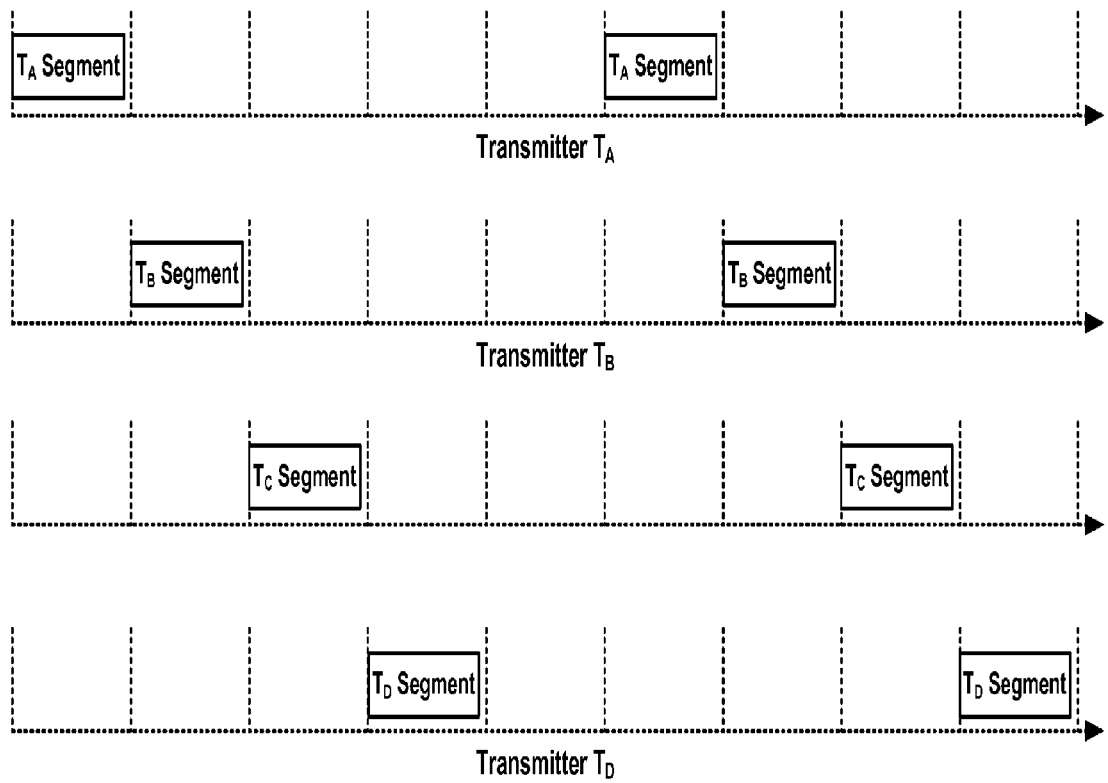
FIG. 3(c) illustrates a portion of respective radio frequency (RF) signal output by each of the transmitters in the system of FIG. 1, according to an example of the first embodiment.

At step 34, each of transmitters $14_A$-$14_D$ may be outputting a respective RF signal on a common time basis and a common carrier frequency in a round-robin manner (i.e., only one of transmitters $14_A$-$14_D$ is outputting an RF signal at any one time). For instance, as shown in FIG. 3(c), each of transmitters $14_A$-$14_D$ may be outputting a segment of the received common drive signal during each of its assigned timeslots as an unmodulated or modulated RF signal on the common carrier frequency. In this respect, as shown, each of transmitters $14_A$-$14_D$ may stop transmitting before the end of each assigned timeslot, to ensure that its output does not overlap with another transmitter's output. Alternatively, however, each of transmitters $14_A$-$14_D$ may transmit during the entire duration of each assigned timeslot. In either case, each of transmitters $14_A$-$14_D$ may enable its power during each of its assigned timeslots (as identified by the timeslot assignment signal) and disable its power during any other timeslot (as identified by the timeslot assignment signal). Other examples are possible as well.

Figure 3D:
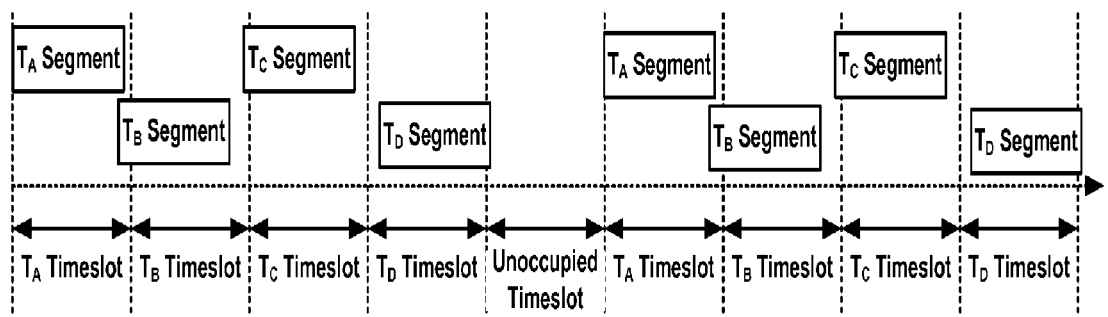
FIG. 3(d) illustrates a portion of a common RF signal received by the mobile device in the system of FIG. 1, according to an example of the first embodiment.

At step 36, mobile device 18 may be receiving a common RF signal on the common carrier frequency that includes a respective RF signal from each of transmitters $14_A$-$14_D$. For instance, mobile device 18 may be receiving a common RF signal on the common carrier frequency that includes repeating periods of timeslots, each having (a) at least one timeslot occupied by a respective signal segment received from each of transmitters $14_A$-$14_D$ in a round-robin manner and (b) at least one unoccupied timeslot. For example, as shown in FIG. 3(d), each period of timeslots of the received common RF signal may have a first timeslot occupied by a signal segment received from transmitter $14_A$, a second timeslot occupied by a signal segment received from transmitter $14_B$, a third timeslot occupied by a signal segment received from transmitter $14_C$, a fourth timeslot occupied by a signal segment received from transmitter $14_D$, and a fifth timeslot that is unoccupied. Further, as shown, the respective signal segments from each of transmitters $14_A$-$14_D$ may have a phase shift relative to one another due to the differences in transmission times (and thus distances) between each of transmitters $14_A$-$14_D$ and mobile device 18. (While FIG. 3(d) depicts the timeslots of the received common RF signal as being defined based on the signal segment received from transmitter $14_A$, it should be understood that the timeslots may alternatively be defined based on a signal segment received from one of transmitters $14_B$-$14_D$.) Other examples are possible as well.

At step 38, mobile device 18 may capture data representing the received common RF signal. For instance, mobile receiver 18 may capture a timestamp of each zero-crossing of the received common RF signal (e.g., for a sinusoidal wave). Alternatively, mobile device 18 may capture a timestamp of each rising and/or falling edge of the received RF signals (e.g., for a square wave). Other examples are possible as well. At step 40, mobile device 18 may also optionally report the captured data representing the received common RF signal to central server 20.

At step 42, based on the captured data representing the received common RF signal, mobile device 18 and/or central server 20 may discriminate between each respective RF signal that forms the received common RF signal. For instance, based on the captured data representing the received common RF signal, mobile device 18 and/or central server 20 may first identify a timeslot of the received common RF signal that is unoccupied (e.g., a time period with a minimal number of captured data points). In turn, mobile device 18 and/or central server 20 may identify a beginning of a new period of timeslots immediately following the unoccupied timeslot (e.g., a first captured data point after the time period with no timestamps). Based on the known arrangement of timeslot periods, mobile device 18 and/or central server 20 may then discriminate between each respective timeslot in the new period of timeslots and thereby discriminate between each respective signal segment in the new period of timeslots. Further, based on the known arrangement of timeslot periods, mobile device 18 and/or central server 20 may identify which respective signal segment was output by which of transmitters $14_A$-$14_D$. Mobile device 18 and/or central server 20 may repeat this process to discriminate between each respective timeslot (and each respective signal segment) in each period of timeslots in the received common RF signal. Other examples are possible as well.

After discriminating between each respective timeslot and respective signal segment in the common drive signal, mobile device 18 and/or central server 20 may process the data representing the signal segment in each respective timeslot to align the time base of mobile device 18 with the common time base of transmitters $14_A$-$14_D$. For example, mobile device 18 and/or central server 20 may (a) slot the captured data points into modulus buckets, (b) identify the captured data points falling into the most popular modulus, and (c) perform a least squares fit on the identified captured data points to generate an accurate time base. Other examples are possible as well.

At step 44, after discriminating between each respective RF signal that forms the received common RF signal, mobile device 18 and/or central server 20 may determine a relative phase shift value of each respective RF signal. For instance, in each period of timeslots, mobile device 18 and/or central server 20 may first identify one or more captured data points representing each respective signal segment. Further, mobile device 18 and/or central server 20 may define one signal segment in the period as a reference signal segment having a relative phase shift value of 0. For each given segment in the period other than the reference segment, mobile device 18 and/or central server 20 may then (a) calculate a first time difference between the given segment and the reference segment and (b) calculate a second time difference between the given segment's timeslot and the reference segment's timeslot (e.g., based on the known duration of timeslots). In turn, mobile device 18 and/or central server 20 may calculate the relative phase shift of the given segment with respect to the reference segment as the time difference between the first and second calculated time differences. As mentioned above, FIG. 3(d) illustrates the relative phase shift of the respective signal segment received from each of transmitters $14_B$-$14_D$ with respect to the signal segment received from transmitter $14_A$.

At step 46, after determining a relative phase shift value of each respective RF signal, mobile device 18 and/or central server 20 may use the relative phase shift values and the known location(s) of each of transmitters $14_A$-$14_D$ to determine a location of mobile device 18. For instance, based on the relative phase shift values, mobile device 18 and/or central server 20 may first calculate the absolute distances between mobile device 18 and each of transmitters $14_A$-$14_D$ using any technique now known or later developed. In turn, based on the absolute distances between mobile device 18 and each of transmitters $14_A$-$14_D$ and the known location(s) of each of transmitters $14_A$-$14_D$, mobile device 18 and/or central server 20 may calculate the location of the mobile device 18 using any technique now known or later developed (e.g., multilateration). For example, based on the absolute distances between mobile device 18 and each of transmitters $14_A$-$14_D$ and the known location of each of transmitters $14_A$-$14_D$ within indoor environment 22, mobile device 18 and/or central server 20 may calculate the location of the mobile device 18 within the indoor environment (e.g., local coordinates). As another example, based on the absolute distances between mobile device 18 and each of transmitters $14_A$-$14_D$ and the known location of each of transmitters $14_A$-$14_D$ within a global environment, mobile device 18 and/or central server 20 may calculate the location of the mobile device 18 within the global environment (e.g., geographic coordinates). Other examples are possible as well.

At step 48, if mobile device 18 determines its location, mobile device 18 may also report the determined location to central server 20. At step 50, central server 20 may then store the determined location of mobile device 18 for future reference.

b. Second Embodiment

Figure 4A:
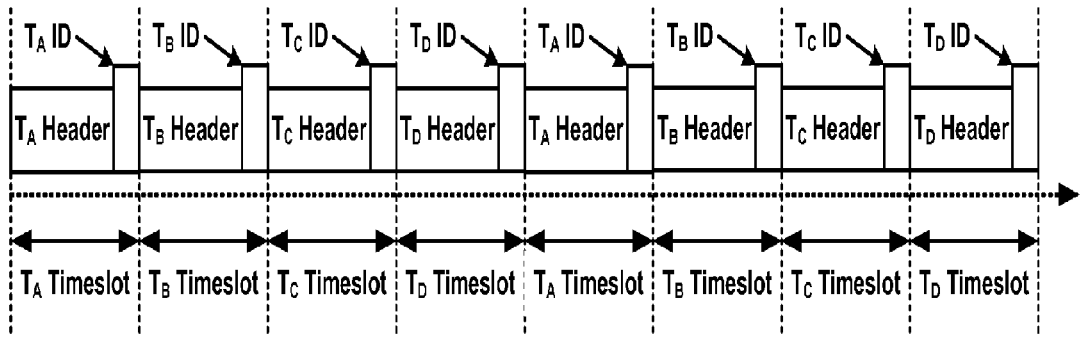
FIG. 4(a) illustrates a portion of a common drive signal generated by the CSS in the system of FIG. 1, according to an example of a second embodiment.

A second embodiment of exemplary method 30 begins at step 32 with CSS 12 driving each of transmitters $14_A$-$14_D$ to output a respective RF signal on a common time basis and a common carrier frequency in a round-robin manner. For instance, CSS 12 may be generating a common drive signal that has repeating periods of timeslots, each having at least one timeslot assigned to each of transmitters $14_A$-$14_D$ in a round-robin manner. Each timeslot may be occupied by a respective signal segment of the common drive signal that includes a header segment and an identifier segment that uniquely identifies the assigned transmitter. The arrangement of the timeslot periods may also have various forms and may be a known system parameter. In one example, as shown in FIG. 4(a), each period of timeslots of the common drive signal may be arranged to have a first timeslot assigned to transmitter $14_A$, a second timeslot assigned to transmitter $14_B$, a third timeslot assigned to transmitter $14_C$, and a fourth timeslot assigned to transmitter $14_D$. Other examples are possible as well.

Each header segment may take various forms. For example, each header segment in the sequence may take the form of an integral number of cycles of a square wave having a frequency in the baseband range (e.g., 5 KHz to 20 KHz). Other examples are possible as well. Each identifier segment in the sequence may also take various forms. For example, each identifier segment may take the form of a bit pattern in which each "1" bit is represented by plurality of cycles (e.g., 5) of a square wave having a frequency in an increased baseband range (e.g., 20 KHz to 100 KHz range) and each "0" bit is represented by a null signal. Other examples are possible as well.

Figure 4B:
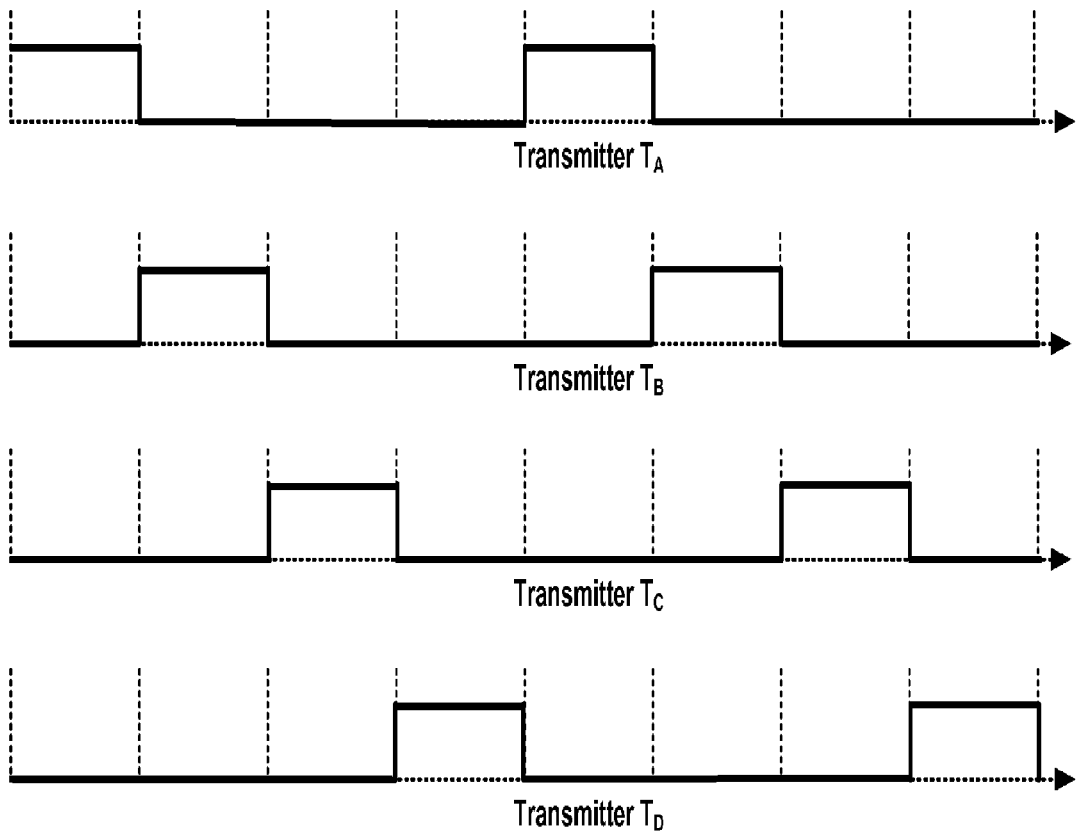
FIG. 4(b) illustrates a portion of a respective timeslot assignment signal for each of the transmitters in the system of FIG. 1, according to an example of the second embodiment.

As in the first embodiment, to communicate the timeslot assignments to transmitters $14_A$-$14_D$, CSS 12 may additionally be generating for each of transmitters $14_A$-$14_D$ a respective timeslot assignment signal that identifies which timeslots in the common drive signal are assigned to the transmitter. Each such timeslot assignment signal may take various forms. For example, as shown in FIG. 4(b), each timeslot assignment signal may take the form of a bit sequence, with each "1" bit identifying the timeslot in the parallel common drive signal as being assigned to the transmitter and each "0" bit identifying the timeslot in the parallel common drive signal as being assigned to a different transmitter. Other examples are possible as well.

CSS 12 may then be outputting to each of transmitters $14_A$-$14_D$ the common drive signal and a respective timeslot assignment signal. In this respect, as in the first embodiment, CSS 12 may be delaying the output of the common drive signal and a respective timeslot assignment signal to at least one of transmitters $14_A$-$14_D$, to ensure that all of transmitters $14_A$-$14_D$ receive these signals on a common time basis. For instance, CSS 12 may be delaying the output of these signals to each of transmitters 14$_A$-14$_D$ in an amount that is inversely proportional to the length of the transmitter's link (e.g., zero or minimum delay for the longest link and maximum delay for the shortest link). Other examples are possible as well. As a result of CSS 12 outputting to each of transmitters 14$_A$-14$_D$ the common drive signal and a respective timeslot assignment signal, each of transmitters 14$_A$-14$_D$ may then be receiving the common drive signal and a respective timeslot assignment signal on a common time basis.

Figure 4C:
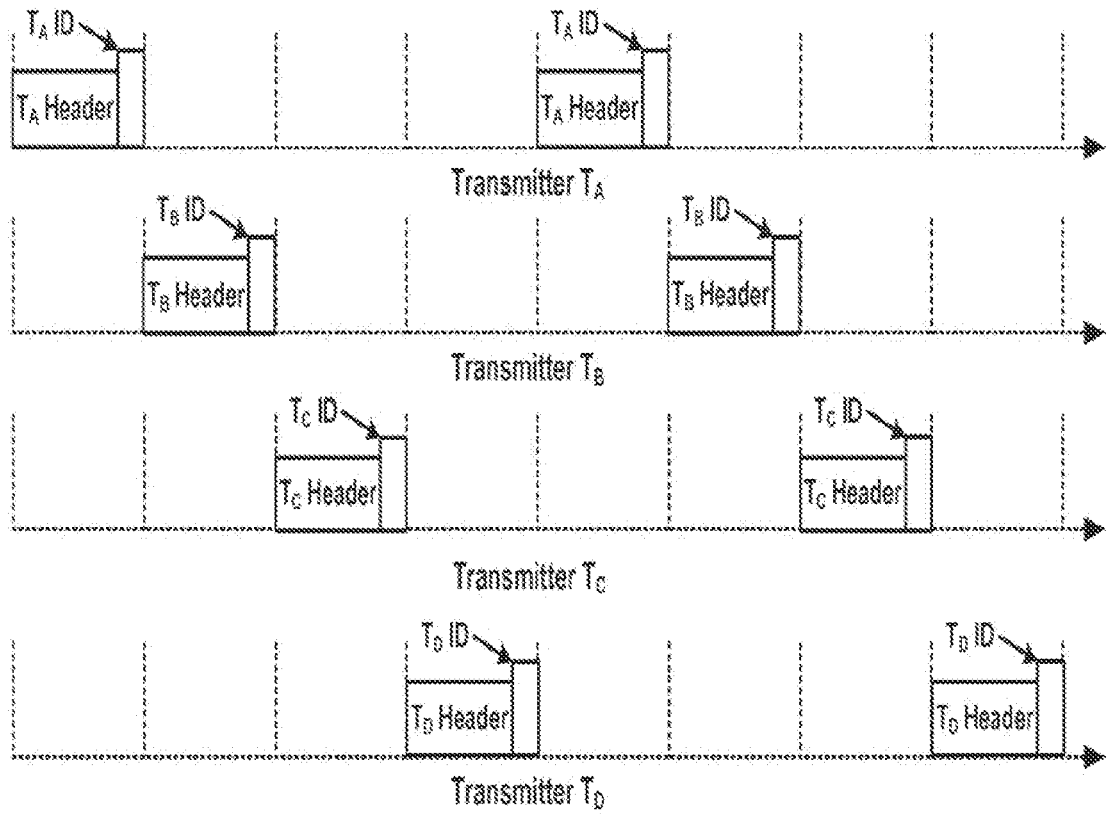
FIG. 4(c) illustrates a portion of respective RF signal output by each of the transmitters in the system of FIG. 1, according to an example of the second embodiment.

At step 34, each of transmitters 14$_A$-14$_D$ may be outputting a respective RF signal on a common time basis and a common carrier frequency in a round-robin manner (i.e., only one of transmitters 14$_A$-14$_D$ is outputting an RF signal at any one time). For instance, as shown in FIG. 4(c), each of transmitters 14$_A$-14$_D$ may be outputting a header and identifier segment of the received common drive signal during each of its assigned timeslots as an unmodulated or modulated RF signal on the common carrier frequency. In this respect, as shown, each of transmitters 14$_A$-14$_D$ may transmit during the entire duration of each assigned timeslot. Alternatively, however, each of transmitters 14$_A$-14$_D$ may stop transmitting before the end of each assigned timeslot, to ensure that the transmitter's output does not overlap with another transmitter's output. In either case, each of transmitters 14$_A$-14$_D$ may enable its power during each of its assigned timeslots (as identified by the timeslot assignment signal) and disable its power during any other timeslot (as identified by the timeslot assignment signal). Other examples are possible as well.

Figure 4D:
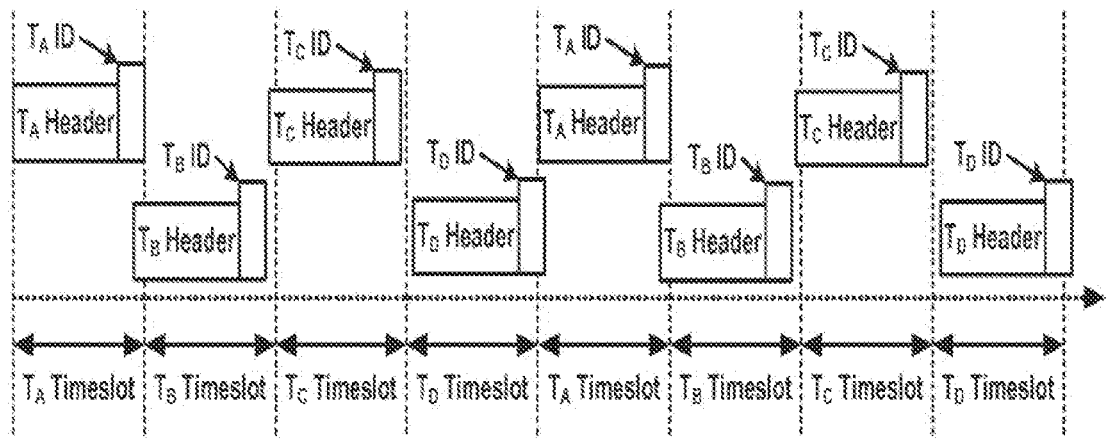
FIG. 4(d) illustrates a portion of a common RF signal received by the mobile device in the system of FIG. 1, according to an example of the second embodiment.

At step 36, mobile device 18 may be receiving a common RF signal on the common carrier frequency that includes a respective RF signal from each of transmitters 14$_A$-14$_D$. For instance, mobile device 18 may be receiving a common RF signal on the common carrier frequency that includes repeating periods of timeslots, each having at least one timeslot occupied by a respective header and identifier segment received from each of transmitters 14$_A$-14$_D$ in a round-robin manner. For example, as shown in FIG. 4(d), each period of timeslots of the received common RF signal may have a first timeslot occupied by a header and identifier segment received from transmitter 14$_A$, a second timeslot occupied by a header and identifier segment received from transmitter 14$_B$, a third timeslot occupied by a header and identifier segment received from transmitter 14$_C$, and a fourth timeslot occupied by a header and identifier segment received from transmitter 14$_D$. Further, as shown, the respective signal segments from each of transmitters 14$_A$-14$_D$ may have a phase shift relative to one another due to the differences in transmission times (and thus distances) between each of transmitters 14$_A$-14$_D$ and mobile device 18. (While FIG. 4(d) depicts the timeslots of the received common RF signal as being defined based on the signal segment received from transmitter 14$_A$, it should be understood that the timeslots may alternatively be defined based on a signal segment received from one of transmitters 14$_B$-14$_D$.) Other examples are possible as well.

At step 38, mobile device 18 may capture data representing the received common RF signal. For instance, mobile device 18 may capture a timestamp of each rising and/or falling edge of the header and identifier segments. Other examples are possible as well. At step 40, mobile device 18 may also optionally report the captured data representing the received common RF signal to central server 20.

At step 42, based on the captured data representing the received common RF signal, mobile device 18 and/or central server 20 may discriminate between each respective RF signal that forms the received common RF signal. For instance, based on the captured data representing the received common RF signal, mobile device 18 and/or central server 20 may first identify the identifier segments of the received common RF signal. Mobile device 18 and/or central server 20 perform this identification in various manners. In one example, mobile device 18 and/or central server 20 may search for segments of the common drive signal that take the form of a bit pattern in which each "1" bit is represented by plurality of cycles (e.g., 5) of a square wave having a frequency in an increased baseband range (e.g., 20 KHz to 100 KHz range) and each "0" bit is represented by a null signal. These segments may appear to mobile device 18 and/or central server 20 as time periods with a large number of captured data points. Other examples are possible as well. Based on these identifier segments and the known arrangement of timeslots, mobile device 18 and/or central server 20 may then discriminate between each respective timeslot in the common drive signal and thereby discriminate between each respective signal segment received in the common drive signal.

After discriminating between each respective timeslot and respective signal segment in the common drive signal, mobile device 18 and/or central server 20 may process the data representing the header segment in each respective timeslot to align the time base of mobile device 18 with the common time base of transmitters 14$_A$-14$_D$. For example, mobile device 18 and/or central server 20 may (a) slot the captured data points into modulus buckets, (b) identify the captured data points falling into the most popular modulus, and (c) perform a least squares fit on the identified captured data points to generate an accurate time base. Other examples are possible as well. In turn, mobile device 18 and/or central server 20 may use the aligned time base of mobile device 18 to accurately determine the pattern of the identifier segment in each respective signal segment, and thus identify which respective signal segment was output by which of transmitters 14$_A$-14$_D$. Other examples are possible as well.

At step 44, after discriminating between each respective RF signal that forms the received common RF signal, mobile device 18 and/or central server 20 may determine a relative phase shift value of each respective RF signal. For instance, in each period of timeslots, mobile device 18 and/or central server 20 may first identify one or more captured data points representing each respective identifier segment (e.g., a timestamp of a first rising edge of each identifier segment). Mobile device 18 and/or central server 20 may then define one identifier segment in the period as a reference identifier segment having a relative phase shift value of 0. For each given identifier segment in the period other than the reference identifier segment, mobile device 18 and/or central server 20 may then (a) calculate a first time difference between the given identifier segment and the reference identifier segment and (b) calculate a second time difference between the given identifier segment's timeslot and the reference identifier segment's timeslot (e.g., based on the known duration of timeslots). In turn, mobile device 18 and/or central server 20 may calculate the relative phase shift of the given identifier segment (and thus the given signal segment) with respect to the reference identifier segment (and thus the reference signal segment) as the time difference between the first and second calculated time differences. As mentioned above, FIG. 4(d) illustrates the relative phase shift of the respective signal segment received from each of transmitters 14$_B$-14$_D$ with respect to the signal segment received from transmitter 14$_A$.

At step 46, after determining a relative phase shift value of each respective RF signal, mobile device 18 and/or central server 20 may use the relative phase shift values and the known location(s) of each of transmitters 14$_A$-14$_D$ to determine a location of mobile device 18. For instance, based on the relative phase shift values, mobile device 18 and/or central server 20 may first calculate the absolute distances between mobile device 18 and each of transmitters $14_A$-$14_D$ using any technique now known or later developed. In turn, based on the absolute distances between mobile device 18 and each of transmitters $14_A$-$14_D$ and the known location(s) of each of transmitters $14_A$-$14_D$, mobile device 18 and/or central server 20 may calculate the location of the mobile device 18 using any technique now known or later developed (e.g., multilateration). For example, based on the absolute distances between mobile device 18 and each of transmitters $14_A$-$14_D$ and the known location of each of transmitters $14_A$-$14_D$ within indoor environment 22, mobile device 18 and/or central server 20 may calculate the location of the mobile device 18 within the indoor environment (e.g., local coordinates). As another example, based on the absolute distances between mobile device 18 and each of transmitters $14_A$-$14_D$ and the known location of each of transmitters $14_A$-$14_D$ within a global environment, mobile device 18 and/or central server 20 may calculate the location of the mobile device 18 within the global environment (e.g., geographic coordinates). Other examples are possible as well.

At step 48, if mobile device 18 determines its location, mobile device 18 may also report the determined location to central server 20. At step 50, central server 20 may then store the determined location of mobile device 18 for future reference.

c. Third Embodiment

Figure 5:
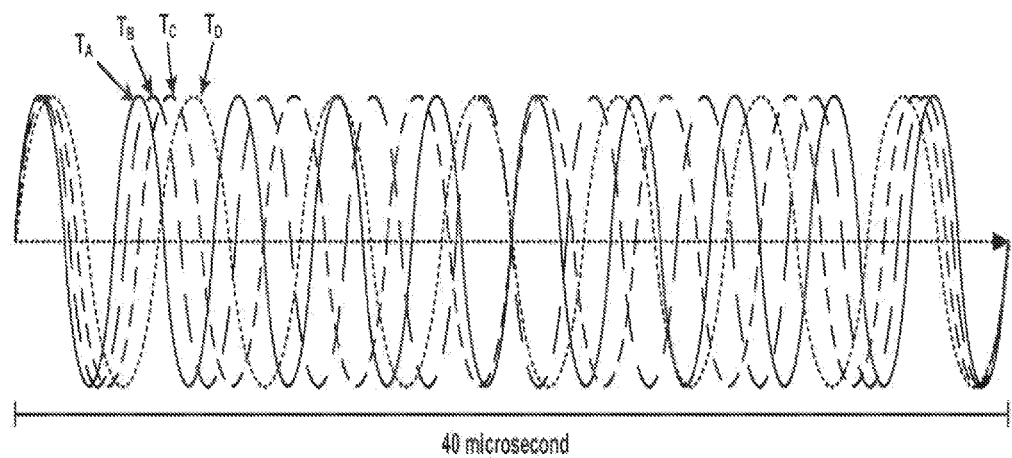
FIG. 5 illustrates a portion of the respective RF signals generated by the CSS in the system of FIG. 1, according to an example of a third embodiment.

A third embodiment of exemplary method 30 begins at step 32 with CSS 12 driving each of transmitters $14_A$-$14_D$ to output a respective RF signal on a common time basis and a different carrier frequency. For instance, CSS 12 may be generating a separate drive signal for each of transmitters $14_A$-$14_D$, with each drive signal having a different frequency. Each separate drive signals may take various forms. For example, each separate drive signal may be a sinusoidal wave having a frequency in the long-wave band range (e.g., 148.5 KHz to 283.5 KHz). Other examples are possible as well. CSS 12 will preferably select the different frequencies such that each separate drive signal includes an integral number of cycles during a commonly-defined duration. For example, as shown in FIG. 5, CSS 12 may generate separate drive signals having frequencies of 250, 225, 200, and 175 KHz respectively, such that each separate drive signal includes an integral number of cycles (10, 9, 8, and 7 respectively) during a 40 microsecond window. Other examples are possible as well.

CSS 12 may then be outputting a separate drive signal to each of transmitters $14_A$-$14_D$. In this respect, CSS 12 may be delaying the output of the separate drive signal to at least one of transmitters $14_A$-$14_D$, to ensure that all of transmitters $14_A$-$14_D$ receive these signals on a common time basis. For instance, CSS 12 may be delaying the output of the separate drive signal to each of transmitters $14_A$-$14_D$ in an amount that is inversely proportional to the length of the transmitter's link (e.g., zero or minimum delay for the longest link and maximum delay for the shortest link). Other examples are possible as well. As a result of CSS 12 outputting a separate drive signal to each of transmitters $14_A$-$14_D$, each of transmitters $14_A$-$14_D$ may then be receiving the a separate drive signal on a common time basis.

At step 34, each of transmitters $14_A$-$14_D$ may be outputting a respective RF signal on a common time basis and a different frequency. For instance, each of transmitters $14_A$-$14_D$ may be outputting its separate drive signal as an unmodulated or modulated RF signal on a respective carrier frequency. Other examples are possible as well.

At step 36, mobile device 18 may be receiving a respective RF signal from each of transmitters $14_A$-$14_D$ on a different carrier frequency. For example, mobile device 18 may receive a first RF signal from transmitter $14_A$ on a first frequency, a second RF signal from transmitters $14_B$ on a second frequency, a third RF signal from transmitter $14_C$ on a third frequency, and a fourth RF signal from transmitter $14_C$ on a fourth frequency. Other examples are possible as well.

At step 38, mobile device 18 may capture data representing the respective RF signal from each of transmitters $14_A$-$14_D$. For instance, mobile receiver 18 may simultaneously capture a signal strength value of each respective RF signal at a given sampling rate (e.g., 50 MHz) during a given duration (e.g., a 44 microsecond window). Other examples are possible as well. At step 40, mobile device 18 may also optionally report the captured data representing the received common RF signal to central server 20.

At step 42, mobile device 18 and/or central server 20 may discriminate between each respective RF signal based on the respective carrier frequency of each respective RF signal. In turn, at step 44, mobile device 18 and/or central server 20 may determine a relative phase shift value of each respective RF signal. For instance, mobile device 18 and/or central server 20 may first fit sine waves to the data representing each respective RF signal (e.g., using a sliding correlator algorithm). Mobile device 18 and/or central server 20 may then define one respective RF signal as a reference signal having a relative phase shift value of 0. (Mobile device 18 and/or central server 20 may also use the reference signal to align the time base of mobile device 18 with the common time base of transmitters $14_A$-$14_D$). For each respective RF signal other than the reference signal, mobile device 18 and/or central server 20 may then calculate a first phase difference between the respective RF signal and the reference signal and (b) calculate a second phase difference between the respective RF signal's carrier frequency and the reference signal's carrier frequency. In turn, mobile device 18 and/or central server 20 may calculate the relative phase shift of the respective RF signal with respect to the reference signal as the difference between the first and second calculated phase differences. Other examples are possible as well.

At step 46, after determining a relative phase shift value of each respective RF signal, mobile device 18 and/or central server 20 may use the relative phase shift values and the known location(s) of each of transmitters $14_A$-$14_D$ to determine a location of mobile device 18. For instance, based on the relative phase shift values, mobile device 18 and/or central server 20 may first calculate the absolute distances between mobile device 18 and each of transmitters $14_A$-$14_D$ using any technique now known or later developed. In turn, based on the absolute distances between mobile device 18 and each of transmitters $14_A$-$14_D$ and the known location(s) of each of transmitters $14_A$-$14_D$, mobile device 18 and/or central server 20 may calculate the location of the mobile device 18 using any technique now known or later developed (e.g., multilateration). For example, based on the absolute distances between mobile device 18 and each of transmitters $14_A$-$14_D$ and the known location of each of transmitters $14_A$-$14_D$ within indoor environment 22, mobile device 18 and/or central server 20 may calculate the location of the mobile device 18 within the indoor environment (e.g., local coordinates). As another example, based on the absolute distances between mobile device 18 and each of transmitters $14_A$-$14_D$ and the known location of each of transmitters $14_A$-$14_D$ within a global environment, mobile device 18 and/or central server 20 may calculate the location of the mobile device 18 within the global environment (e.g., geographic coordinates). Other examples are possible as well.

At step 48, if mobile device 18 determines its location, mobile device 18 may also report the determined location to central server 20. At step 50, central server 20 may then store the determined location of mobile device 18 for future reference.

IV. Alternatives

The systems and methods described above are directed to determining a location of a mobile device within an indoor environment. It should be understood, however, that the techniques described herein are not limited to any particular environment, and are thus equally applicable to determining a location of a mobile device in an outdoor or other environment.

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or computer-executable instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), and/or graphics processing unit ("GPU") or system.

It is intended that the foregoing detailed description be regarded as illustrative rather than limiting and that it is understood that the following claims including all equivalents are intended to define the scope of the invention.

I claim:

1. An apparatus comprising:
a processor; and
a memory including computer program code configured to, with the processor, cause the apparatus to:
generate a common radio frequency (RF) signal on a common carrier frequency, wherein the common RF signal includes repeating periods of timeslots for three or more transmitters and an unassigned timeslot configured to indicate an arrangement of the repeating periods of timeslots;
drive the three or more transmitters using the common RF signal,
wherein a location of a mobile device is determinable based on signals received from the three or more transmitters and locations of the three or more transmitters, wherein the signals received from the three or more transmitters are discriminated based on the unassigned timeslot.

2. The apparatus of claim 1, wherein the memory includes computer program code configured to:
generate a timeslot assignment signal that identifies assignments of timeslots to transmitters.

3. The apparatus of claim 2, wherein the timeslot signal instructs each of the three or more transmitters to disable power during timeslots of other transmitters.

4. The apparatus of claim 1, wherein the common RF signal drives the three or more transmitters in a round robin matter.

5. The apparatus of claim 1, wherein the memory includes computer program code configured to:
delay output of the common RF signal to at least one transmitter based on an amount inversely proportional to a length of a link to the at least one transmitter.

6. An apparatus comprising:
a processor; and
a memory including computer program code configured to, with the processor, cause the apparatus to:
generate a common radio frequency (RF) signal on a common carrier frequency, wherein the common RF signal includes repeating periods of timeslots for three or more transmitters, and wherein each of the timeslots includes a header and an identifier segment associated with a respective one of the three or more transmitters;
drive the three or more transmitters using the common RF signal,
wherein a location of a mobile device can be determined based on signals received from the three or more transmitters and locations of the three or more transmitters, wherein the signals received from the three or more transmitters are discriminated based on the identifier segment.

7. The apparatus of claim 6, wherein the memory includes computer program code configured to:
generate a timeslot assignment signal that identifies assignments of timeslots to transmitters.

8. The apparatus of claim 7, wherein the timeslot signal instructs each of the three or more transmitters to disable power during timeslots of other transmitters.

9. The apparatus of claim 6, wherein the common RF signal drives the three or more transmitters in a round robin matter.

10. The apparatus of claim 6, wherein the memory includes computer program code configured to:
delay output of the common RF signal to at least one transmitter based on an amount inversely proportional to a length of a link to the at least one transmitter.

11. A method comprising:
generating a common radio frequency (RF) signal on a common carrier frequency, wherein the common RF signal includes repeating periods of timeslots for three or more transmitters and an unassigned timeslot configured to indicate an arrangement of the repeating periods of timeslots; and
driving the three or more transmitters using the common RF signal,
wherein a location of a mobile device can be determined based on signals received from the three or more transmitters and locations of the three or more transmitters.

12. The method of claim 11, further comprising:
generating a timeslot assignment signal that identifies assignments of timeslots to transmitters.

13. The method of claim 11, wherein the timeslot signal instructs each of the three or more transmitters to disable power during timeslots of other transmitters.

14. The method of claim 11, wherein the common RF signal drives the three or more transmitters in a round robin matter.

15. The method of claim 11, further comprising:
delaying output of the common RF signal to at least one transmitter based on an amount inversely related to a length of a link to the at least one transmitter.

16. A method comprising:
generating a common radio frequency (RF) signal on a common carrier frequency, wherein the common RF signal includes repeating periods of timeslots for three or more transmitters, and wherein each of the timeslots includes a header and an identifier segment associated with a respective one of the three or more transmitters;
driving the three or more transmitters using the common RF signal,
wherein a location of a mobile device is determinable based on signals received from the three or more transmitters and locations of the three or more transmitters.

17. The method of claim 16, further comprising:
generating a timeslot assignment signal that identifies assignments of timeslots to transmitters.

18. The method of claim 17, wherein the timeslot signal instructs each of the three or more transmitters to disable power during timeslots of other transmitters.

19. The apparatus of claim 16, wherein the common RF signal drives the three or more transmitters in a round robin matter.

20. The apparatus of claim 16, further comprising:
delaying output of the common RF signal to at least one of transmitter based on an amount inversely related to a length of a link to the at least one transmitter.

21. An apparatus comprising:
a processor; and
a memory including computer program code configured to, with the processor, cause the apparatus to:
receive a common radio frequency (RF) signal on a common carrier frequency, wherein the common RF signal includes a respective RF signal output by each of three or more transmitters during a respective timeslot and the common RF signal includes an unoccupied timeslot;
capture data representing the common RF signal;
discriminate between each respective RF signal that forms the received common RF signal based on the captured data and timing of the unoccupied timeslot;
determine a relative phase shift of each respective RF signal; and
determine a location of the mobile device based on the determined relative phase shifts and known locations of the three or more transmitters.

22. The apparatus of claim 21, wherein the common RF signal comprises repeating periods of the respective timeslots and the unoccupied timeslot such that each period of timeslots includes at least one timeslot occupied by a respective signal segment output by each of the three or more transmitters in a round robin manner.

23. The apparatus of claim 21, wherein the memory includes computer program code configured to:
identify a timestamp of each zero-crossing of the common RF signal.

24. The apparatus of claim 21, wherein the memory includes computer program code configured to:
identify a timestamp of each edge of the common RF signal.

25. An apparatus comprising:
a processor; and
a memory including computer program code configured to, with the processor, cause the apparatus to:
receive a common radio frequency (RF) signal on a common carrier frequency, wherein the common RF signal includes a respective RF signal output by each of three or more transmitters during a respective timeslot and the common RF signal includes a header and an identifier segment associated with each of the three or more transmitters;
capture data representing the common RF signal;
discriminate between each respective RF signal that forms the received common RF signal based on the identifier segment;
determine a relative phase shift of each respective RF signal; and
determine a location of the mobile device based on the determined relative phase shifts and known locations of the three or more transmitters.

26. The apparatus of claim 25, wherein the common RF signal comprises repeating periods of the respective timeslots and the unoccupied timeslot such that each period of timeslots includes at least one timeslot occupied by a respective signal segment output by each of the three or more transmitters in a round robin manner.

27. The apparatus of claim 25, wherein the memory includes computer program code configured to:
identify a timestamp of each zero-crossing of the common RF signal.

28. The apparatus of claim 25, wherein the memory includes computer program code configured to:
identify a timestamp of each edge of the common RF signal.

* * * * *